United States Patent [19]

Romey et al.

[11] 4,351,739
[45] Sep. 28, 1982

[54] SOUND ABSORBENT PANEL

[75] Inventors: Ingo Romey, Hüenxe; Willi Trojan, Aachen, both of Fed. Rep. of Germany

[73] Assignee: Bergwerksverband GmbH, Essen, Fed. Rep. of Germany

[21] Appl. No.: 72,921

[22] Filed: Sep. 6, 1979

[30] Foreign Application Priority Data

Sep. 7, 1978 [DE] Fed. Rep. of Germany ....... 2838944

[51] Int. Cl.$^3$ .............................................. C04B 43/00
[52] U.S. Cl. ...................................... 252/62; 428/489
[58] Field of Search ............................ 252/62; 52/404; 181/294; 106/38.8, 284; 260/28.5 AS; 428/489

[56] References Cited

U.S. PATENT DOCUMENTS

| 2,047,576 | 7/1936 | Byers | 106/18 |
| 2,077,094 | 4/1937 | Byers | 106/18 |
| 2,221,499 | 11/1940 | Torri | 106/31 |
| 2,733,159 | 1/1956 | Scoggin et al. | 106/277 |
| 2,742,373 | 4/1956 | Groskopf | 106/277 |
| 2,742,374 | 4/1956 | Groskopf | 106/277 |
| 3,243,374 | 3/1966 | Gillard | 252/62 |
| 3,808,164 | 4/1974 | Gulino et al. | 260/28.5 AS |
| 3,824,110 | 7/1974 | Pelz et al. | 106/284 |
| 3,890,263 | 6/1975 | Meynard | 260/28.5 AS |
| 3,895,143 | 7/1975 | Tarlow | 428/40 |
| 3,916,049 | 10/1975 | Kingsbury | 428/35 |
| 4,133,932 | 1/1979 | Peck | 428/323 |
| 4,193,474 | 3/1980 | Okubo et al. | 181/287 |
| 4,204,022 | 5/1980 | Snyder et al. | 428/337 |

FOREIGN PATENT DOCUMENTS

| 532453 | 10/1956 | Canada | 252/62 |
| 932420 | 7/1963 | United Kingdom | 252/62 |
| 986632 | 3/1965 | United Kingdom | 252/62 |
| 1000830 | 8/1965 | United Kingdom | 252/62 |
| 1039711 | 8/1966 | United Kingdom | 181/294 |
| 1100453 | 1/1968 | United Kingdom | 181/294 |
| 381654 | 8/1973 | U.S.S.R. | |

Primary Examiner—P. E. Willis, Jr.
Attorney, Agent, or Firm—Michael J. Striker

[57] ABSTRACT

A composition for sound absorbent panels, which may be utilized in construction elements, comprises a mixture of 70 to 97 weight percent of carbon-contained material and a binder of synthetic plastic material. The carbon-contained material used in the composition contains 50–60% of pure carbon and 40–50% of inorganic constituents and may be obtained from residues of coal hydrogenation or pitch filtration. The material is treated at an elevated temperature and under pressure before the binder is added thereto and then the obtained compound is formed into a panel.

3 Claims, No Drawings

SOUND ABSORBENT PANEL

BACKGROUND OF THE INVENTION

The invention relates to a sound absorbent panel particularly for cassette or sandwich elements.

In the construction of sheds, building sections or walls, increasing use is made of prefabricated cassette or sandwich elements which, for example, may consist of steel plate, wood or plastic. Thermally insulating and sound absorbent materials such as glass or mineral wool and barite usually in the shape of sound absorbent panels made of these materials, such as for instance mineral fiber panels, are located in the interior of these constructions. Despite the high density of these sound absorbent panels, the cassette or sandwich elements constructed with these, will generally reach a rated sound transmission loss of only 40 dB–45 dB.

The invention is now based upon the task of increasing the rated sound transmission loss of known cassette or sandwich elements.

SUMMARY OF THE INVENTION

As per invention, this task is solved by the sound absorbent panels installed in the cassette or sandwich elements consisting to about 70% to 97% by weight of a material with high carbon content, in a mixture with a binder of 3% to 30% by weight. Such panels have a construction sound transmission loss rated higher than panels from mineral fibers or barite.

DETAILED DESCRIPTION OF THE INVENTION

It is extremely surprising that the panels as per invention possess a sound transmission loss rated so high, since the density is only about 0.9 g/cm$^3$ to 1.59 g/cm$^3$ and since it is known that a high rate of sound transmission loss is, in the first instance attained by mass, i.e. by a high density of the absorbent material. The rated sound transmission loss was measured by a sample test as per DIN 52 210-75. This DIN rule corresponds to the rules ISO/R 140-1960 and ISO/R 717-1968 of the International Organization for Standardization. It amounts to 47 dB–50 dB.

For the production of a mixture with the binder, the material with high carbon content, which in the known processes is obtained as a brittle melt high in carbon, is suitably reduced to a granulation of preferably 1 mm to 10 mm and, after admixture of the binder, fabricated into panels of 5 mm to 30 mm thickness. Materials of high carbon content which come into consideration may consist of residues from coal hydrogenation and/or from the filtration of tar or pitch scrubbing. In every instance, these materials of high carbon content are products consisting to about 50% to 60% of pure carbon and furthermore essentially of aromatics with three or more nuclei.

The latter are called asphaltenes and represent aromatics that cannot be distilled any further. The remainder may consist up to 40% and more of inorganic constituents.

As per invention, the binder consists of a thermosetting or thermoplastic material. Suitable thermosetting plastics are, in the first line, polyester resins or epoxy resins, for instance cold or warm curing systems. As thermoplastics however, polyolefins, for instance polyethylene, polypropylene and copolymers of ethylene and propylene, such as ethylene-vinylacetate copolymers, can be considered. Thermoplastics with elastic properties, such as f.i. ethylene propylene rubber (EPR) will, however, also come into consideration.

The plastic may be mixed with the carbon-containing material in pulverized form possibly homogeneous, but also in dissolved or emulgated form. The water of the emulsion can, in such case, be removed either by evaporation or by de-airing during processing.

If the mixture is to be fabricated into sound absorbent panels in a press, it is advisable to allow for momentary tension relieving during pressing, in order to allow the escape of gases that may possibly become free.

The residues of coal hydrogenation required for the production of the sound absorbent panels can be obtained, for example, in the following manner:

In the hydrogenation of coal, the coal is mixed with a diluting oil and, treated with a hydrogen under high pressures and at increased temperatures, in most cases in the presence of catalysts. The more hydrogen is brought to act upon the coal, the more liquid products of the hydrogenation are obtained. First of all, the low-boiling oils and gases are separated from the product of hydrogenation, whereupon the bottom product is subjected to vacuum distillation. A residue of asphaltenes, undissolved coal, mineralic components and catalyst is obtained herein in a state ranging from more or less free-flowing to solid. This residue of hydrogenation is an excellent material for the production of sound absorbent panels as per invention. Residues of tar and pitch scrubbing, coming into consideration as further precursor materials, are obtained, for example, in the following manner:

Tar will accrue in gasification and combustion processes of hard coal. Scrubbing of these raw tars can be made by filtrating the raw tar at high temperatures under pressure. The filtration residues accruing herein also constitute a material high in carbon, with up to about 50% inorganic constituents.

A further useful precursor material can be obtained by filtration at about 160° C. to 250° C. of the raw hard coal pitch which is in solid state at normal temperature. Suitable for this filtration are for example pressure and vacuum filters with metallic filter elements having a slot width of 80 to 120 m. It is also suitable for this filtration, that an auxiliary filtering agent such as f.i. silica gel is added to the pitch. The residue from filtration is in its constitution very similar to the residue from tar filtration. The following example will explain in detail the production of the sound absorbent panels.

EXAMPLE 1

40 parts by weight of long-flaming gas coal are reduced to less than 100 μm and mixed with 60 parts per weight of a diluting oil obtained from a hydrogenation process. The mixture is hydrogenated in a hydrogenation reactor in the presence of $Fe_2O_3$ as catalyst and under admixture of 5% hydrogen at a pressure of 300 bar and a temperature of 475° C. In this manner, a mixture of gases, coal oils of different boiling ranges and non-distillable organic constituents, as well as of undissolved coal, minerals and catalyst, will accrue from hydrogenation.

This mixture is divided in an separate vessel into a bottom product consisting of heavy oil, asphaltenes, undissolved coal, minerals and catalyst and into a top product consisting of raw boiling oils and gas. The distilled oils are removed from the bottom product in a vacuum still at a pressure of 35 millibars and at 200° C. to 300° C.

The residue consists of a brittle melt high in carbon, which is reduced to a granulation of 1-5 mm. This free-flowing mass is mixed with 3% of a warm-curing polyester resin and rolled into endless sheets, whereby curing of the added resin is effected by hot air in a furnace.

The sheets have a density of 1.4 g/cm$^3$ and an area weight of 16.7 kg/m$^2$. the rated sound transmission loss is 50 dB.

EXAMPLE 2

20 parts by weight of long-flaming gas coal are reduced to less than 200 μm, mixed with 30 parts by weight anthracene oil and 2% $Fe_2O_3$, and filled into a pressure autoclave. Hydrogen at a pressure of 300 bar is forced into the autoclave. The autoclave is heated to 429° C. with simultaneous agitation, cooled after a reaction time of two hours, and the reacted mixture removed.

By filtration of the reacted mixture in a pressure filter at 250° C. and a pressure of 2 bar a hydrogenation residue is obtained. This material, high in carbon, contains about 20% of non-hydrogenated coal, 28% mineralic constituents, with the remainder being essentially asphaltenes.

This residue representing a coarse-grained mass with a granulation up to 50 mm, is reduced to 10 mm and mixed in an intensive mixer at 150° C. to 250° C. with 30% by weight of ethylene propylene rubber. This mixture is compacted by pressing at 160° C. and 20 kg/m$^2$.

The plates have a density of 1.2 g/cm$^2$ and an area weight of 16.5 kg/m$^2$. The rated sound transmission loss is 48 dB.

EXAMPLE 3

On filtration of tars with the aid of inorganic filtering auxiliaries such as silica gel or expanded clay aggregate, as well as with carbon-containing filtering auxiliaries, a filtration residue will result containing, apart from the filtering auxiliary, the solids contained in tar such as minerals and soot as well as asphaltenes and further constituents of tar.

The residue consisting of agglomerated brittle granules of 10 mm to 50 mm, is reduced to a particle size of <10 mm, mixed with 4% polyester resin and subsequently fabricated into panels in a panel press at a pressure of 10 kg/m$^2$, with a curing agent being added.

The panels have a density of 1.3 g/cm$^3$ and a heaped weight of 16.6 kg/m$^2$. The rated sound transmission loss is 49 dB.

EXAMPLE 4

Raw hard-coal pitch, with a softening point of 70° C. to 120° C. (Krämer-Sarnow) is heated to about 250° C. to 260° C. and mixed with about 5% silica gel. The mixture is filtered in a pressure filter at 270° C. and a pressure of 2 to 8 bar. A filtration residue will accrue of a crumb-like mass of agglomerated brittle granules, high in carbon, containing, apart from the filtering auxiliary, the solids contained in pitch such as soot, asphaltenes and mineralic constituents. The residue is reduced to a particle size of <10 mm and mixed in an intensive mixer at 150° C. to 250° C. with 30% polyethylene granulate. This mixture is compacted into panels at 170° C. and 20 kg/m$^2$.

The panels have a density of 1.3 g/cm$^3$ and an area weight of 16.6 kg/m$^2$. The rated sound transmission loss is 49 dB.

We claim:

1. A composition for a sound absorbent panel, comprising a mixture of 70 to 97 weight percent of carbon-containing material which is obtained by destillation or filtration as residue of the product of a coal hydrogenation process and/or pitch filtration and having a carbon content of about 50-60% and comprising an inorganic material at least one of the group of minerals, catalysts for coal-hydrogenation and inorganic filtering auxiliaries, with 3-30 weight percent of a binder of thermosetting or thermoplastic material.

2. The composition of claim 1, wherein said carbon-containing material is of granulation from 1 mm to 10 mm.

3. A method of producing sound absorbent panels, comprising essentially the steps of obtaining a carbon-containing material with a carbon content of about 50-60% from residues of coal hydrogenation and/or pitch filtration; granulating the obtained material to a size of 1 to 10 mm; adding to said material a binder of thermosetting or thermoplastic material to obtain a compound for a panel; and forming said compound into a panel.

* * * * *